United States Patent [19]
Shimotsuma et al.

[11] 3,796,099
[45] Mar. 12, 1974

[54] METHOD FOR MEASURING THE SURFACE TEMPERATURE OF A METAL OBJECT

[75] Inventors: Teruo Shimotsuma; Takeo Yamada, both of Yokohama, Japan

[73] Assignee: Nippon Kokan Kabushiki Kaisha, Tokyo, Japan

[22] Filed: Dec. 26, 1972

[21] Appl. No.: 318,691

[30] Foreign Application Priority Data
Dec. 27, 1971  Japan.................................. 47/1258

[52] U.S. Cl. ............................................ 73/355 EM
[51] Int. Cl. ............................. G01j 5/52, G01j 5/24
[58] Field of Search ..................... 73/355 R, 355 EM

[56] References Cited
UNITED STATES PATENTS

| | | | |
|---|---|---|---|
| 2,611,541 | 9/1952 | Gray | 73/355 EM UX |
| 2,737,809 | 3/1956 | Fastie | 73/355 EM |
| 2,837,917 | 6/1958 | Machler | 73/355 EM |
| 2,846,882 | 8/1958 | Gray | 73/355 EM |
| 3,044,297 | 7/1962 | Hanken | 73/355 EM |
| 3,492,869 | 2/1970 | Toyota et al. | 73/355 EM |

OTHER PUBLICATIONS
Bernard, B.: "Determining Emissivity," in Instruments & Control Systems; May, 1964, pp. 87-89, Vol. 37, No. 5. Q-184-I5

Primary Examiner—Richard C. Queisser
Assistant Examiner—Frederick Shoon
Attorney, Agent, or Firm—Flynn & Frishauf

[57] ABSTRACT

An improved method for measuring the surface temperature of objects, such as metals on a color coated sheet iron line, by means of a radiation thermometer, wherein a radiation source hot plate having a surface whose surface temperature is substantially constant and whose emissivity is nearly equal to unity is located opposite to an object to be measured and above that portion of the object to be measured. The temperature of the object portion below the hot plate is considerably lower than that of the portion of the object subject to direct temperature measurement by the radiation thermometer. The emissivity of the metal surface is obtained from a measurement of the reflected radiation from the radiation source hot plate off of the surface of the object, and the value of emissivity of the surface is used to automatically correct the output of the radiation thermometer to provide more accurate temperature measurements.

14 Claims, 4 Drawing Figures

METHOD FOR MEASURING THE SURFACE TEMPERATURE OF A METAL OBJECT

BACKGROUND OF THE INVENTION

The present invention relates to an improved method for measuring the surface temperature of metals such as color coated sheet iron by means of a radiation thermometer. More particularly, the present invention relates to an improved method for surface temperature measurement wherein the surface temperature of an object is measured by means of a radiation thermometer, and the reflectance of the surface of the object is detected to thereby determine the emissivity of the object in order to provide a correction factor for the surface temperature measurement.

DESCRIPTION OF THE PRIOR ART

Generally, radiation thermometers heretofore known in the art have been widely used for non-contact type surface temperature measurements. A troublesome aspect of these prior measuring methods has been how to deal with the emissivity of an object to be measured. Customary temperature measurement methods which are independent of the emissivity of an object to be measured include the cupshape surface temperature thermometer method, the two color thermometer method and the comparison hot plate reflection method (Kellsall method, Toyota method). In practice, however, the cup-shape surface temperature thermometer method is not suited for installation on an in-line operation. It has recently been commonly believed that the two color thermometer is ineffective due to difficulties encountered in establishing the gray color conditions. While the comparison hot plate reflection method is fairly worthy of notice in its operating principle, the time constant for temperature control of the hot plate is large and therefore, difficulties have arisen in adapting it for practical use as an industrial instrument.

It is the principal object of the present invention to provide an improved method for surface temperature measurement wherein even when the emissivity of objects to be measured differ considerably, such as in the case of a color coated sheet iron line, the emissivity of the object can be automatically measured and used as a correction factor to provide a better temperature measurement.

As used herein the term "color coated steel sheet" means, for example, precoated, prefinished or pre-painted steel which is obtained by continuously painting a steel coil and baking same, for example at about 220–250°C for about 90–120 seconds.

SUMMARY OF THE INVENTION

According to the present invention, the surface temperature of a metal object is measured by a temperature measuring device at a point of the metal object which is at a relatively high temperature. Another point on the metal object which is at a substantially lower temperature than that of the point at which the direct temperature measurement is made is irradiated with heat by a radiation source hot plate which has a surface emissivity close to unity and which is maintained at a substantially constant temperature which is higher than the area of the metal surface which is irradiated by the hot plate. The hot plate is arranged such that a solid angle $\theta$ observed from a point of radiation on the metal surface lies within a range $\pi < \theta < 2\pi$. The radiant heat reflected from the metal surface is correlated with the radiant output of the hot plate to determine the emissivity of the metal surface. The determined value of emissivity is then used as a correction factor to the temperature measured at the high temperature portion of the metal object to determine the actual surface temperature of the metal object.

DESCRIPTION OF THE PREFERRED EMBODIMENTS

When there exists a state of thermal equilibrium in a body, the relation between its surface emissivity and reflectance is given as follows:

$$\epsilon + \gamma = 1.0 \qquad (1)$$

where $\epsilon =$ surface emissivity; and
$\gamma =$ reflectance.

It is known that the above equation approximately holds even when the body is not at thermal equilibrium. A unique feature of the improved method of measurement according to the present invention is that the reflectance $\gamma$ of the surface of a body is first measured and the surface emissivity $\epsilon$ is then obtained from the above equation (1). The surface emissivity $\epsilon$ is then used to automatically correct the measurement of a radiation thermometer. In such a case, while the emissivity and reflectance are functions of temperature, even if they are considered to have substantially fixed values, the resultant error would be less than the permissible limit for measurement of temperature under several hundred degrees C.

Figure 1:
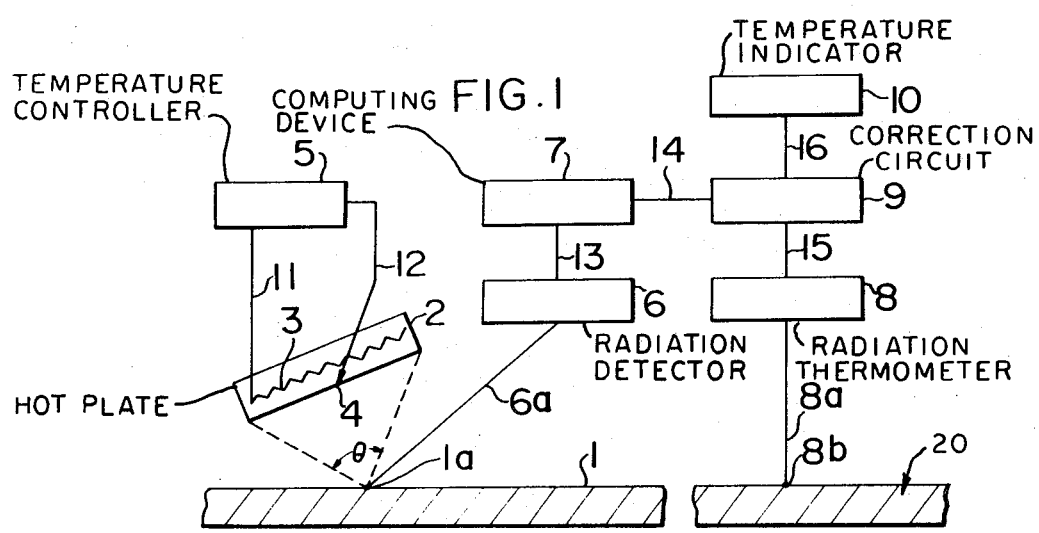
FIG. 1 is a schematic diagram of a system incorporating an embodiment of a method according to the present invention.

Referring now to FIG. 1, there is illustrated schematically an arrangement of a measuring system according to the present invention for use in a continuous processing line. In FIG. 1, the temperature of the surface 1 at point 8b of an object 20 is to be measured. The object 20 may be a color coated sheet of iron, for example, where the emissivity of the object 20 varies considerably. It should be clear, however, that the present invention can be equally applied to any object to be measured having a substantially constant emissivity.

A radiation source hot plate 2 made of a material having a stable emissivity which is close to unity in order to prevent multiple reflection is located adjacent the surface 1 of the object which is to be measured. The hot plate 2 is compressed of a hot plate heating element 3, and a thermocouple 4 for measuring the surface temperature of the hot plate 2. A temperature control element 5 is connected to the hot plate heating element 3 and to thermocouple 4 to maintain the temperature $T_1$ of the radiation source hot plate 2 substantially constant. In effecting the control, it is necessary that the surface temperature of the object 20 to be measured is sufficiently low relative to the value of $T_1$ so that the amount of radiation of the object 20 can be totally neglected. A radiation detector 6 is provided adjacent the surface 1 of the object. At the previously mentioned thermal equilibrium, the emissivity $\epsilon$ and reflectance $\gamma$ of the object 20 and the radiant power output $V_1$ of the radiation source hot plate 2 and the radiant power $V$ reflected from the surface 1 of the object 20 have the following relations:

$$\gamma = V/V_1; \text{ and} \quad (2)$$

$$\epsilon = 1.0 - \gamma. \quad (3)$$

Accordingly, when the reflectance $\gamma$ is to be obtained, the radiant power output $V_1$ of the radiation source hot plate 2 is first detected directly by the radiation detector 6 and this detected value is stored in a reflectance and emissivity computing device 7. Thus, for an on-line measurement, it is only necessary that the radiant power $V$ reflected from the surface 1 of the object be detected by the radiation detector 6. The reflected power $V$ along the line-of-sight 6a is measured and then supplied to the reflectance and emissivity computing device 7 which computes the emissivity $\epsilon$ in accordance with the equations (2) and (3). Computing device 7 already had the value $V_1$ stored therein and first uses equation (2) to determine $\gamma$ and then uses equation (3) to determine $\epsilon$.

Circuits to carry out such computations in accordance with the equations set forth hereinabove should be apparent to those skilled in the art.

The data obtained as the result of measurements made in connection with various experiments have shown that if the angle $\theta$, which denotes the solid angle which is obtained when the radiation source hot plate 2 is viewed from a reflectance detecting point 1a on the surface 1 of the object 20, the accuracy of measurement of the reflectance $\gamma$ can be improved when the value of the angle $\theta$ lies in the following range:

$$\pi < \theta < 2\pi \quad (4)$$

The accuracy of reflectance $\gamma$ increases as the value of $\theta$ approaches $2\pi$. The relationship between the solid angle $\theta$ and the reflectance $\gamma$ will be explained below with reference to FIGS. 3 and 4.

Figure 3:
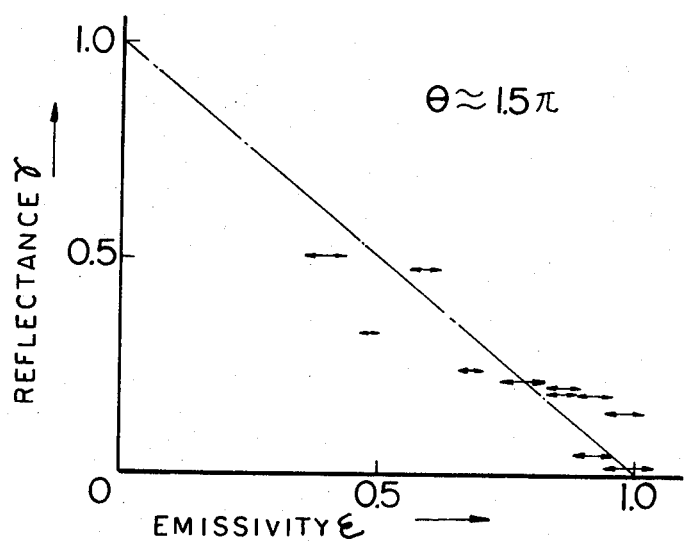
FIGS. 3 and 4 are graphs showing the relationship between the solid angle $\theta$ and reflectance $\gamma$.
Figure 4:
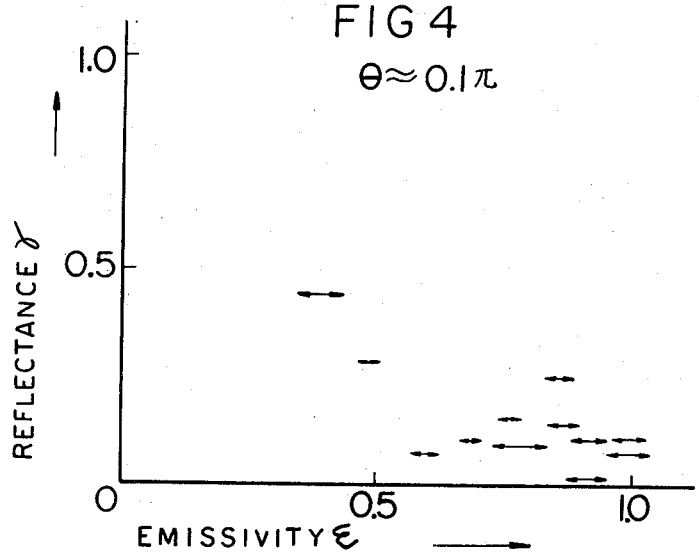

The graphs of FIGS. 3 and 4 are the result of investigations made by employing a radiation detector made of PbS and employing color coated sheet metals as samples with a hot plate temperature $T_1 = 250°C$. It was found that if $\theta = 1.5\pi$ (see FIG. 3), then a measurement accuracy of $\pm 10°C$ at $T_1 = 250°C$ could be expected when the emissivity $\epsilon$ is derived from the reflectance $\gamma$ and subjected to the necessary correction. FIG. 4 shows the relationshp between $\epsilon$ and $\gamma$ when $\theta \approx 0.1\pi$.

The automatic correction circuit of the present invention is readily integrated with the above-described reflectance measuring system. The basic reflectance measuring system comprises the radiation source hot plate 2, the temperature control element 5, the radiation detector 6 and the reflectance and emissivity computing device 7. A typical automatically corrected system further comprises a radiation thermometer 8 to carry out a temperature measurement. Radiation thermometer 8 contains therein a radiation detector of the same general type as the radiation detector 6 and measures the temperature of a measurement area 8b (along the line-of-sight line 8a) which is higher in temperature than the reflectance measuring area 1a. An emissivity correction circuit 9 is coupled to the output of computing device 7 and radiation thermometer 8 and a temperature indicating recorder 10 is coupled to the output of emissivity correction circuit 9. Numerals 11, 12, 13, 14, 15 and 16 designate electrical signal lines. By supplying the value of emissivity $\epsilon$ computed in the relectance and emissivity computing device 7 to the emissivity correction circuit 9, the output of the temperature measuring radiation thermometer 8 can be corrected to thereby automatically record the surface temperature of the objects 20 on the continuous processing line. For example, if the graduations of the temperature indicating recorder 10 correspond to the case when emissivity is unity, for example when a value of emissivity $\epsilon$ of 0.5 is transmitted from emissivity computing device 7 via line 14, the emitted energy detected by radiation thermometer 8 is doubled by means of the correction circuit 9. Thus, correct temperatures are thereby indicated by the temperature indicating recorder 10. Correction circuit 9 may comprise, for example, an amplifier (such as a linear amplifier) whose amplification factor is varied in inverse proportion to values of emissivity from device 7, or a potentiometer-type device whose transfer characteristic is varied as a function of the emissivity values from device 7.

In a typical application, the temperature $T_1$ of the hot plate surface is about 250°C, the temperature at area 8b is about 250°C. and the temperature at area 1a is ambient temperature. In this regard, it is pointed out that areas 1a and 8b are generally far from each other. FIG. 1 is not drawn to scale in the illustration of the location of areas 1a and 8b.

Figure 2:
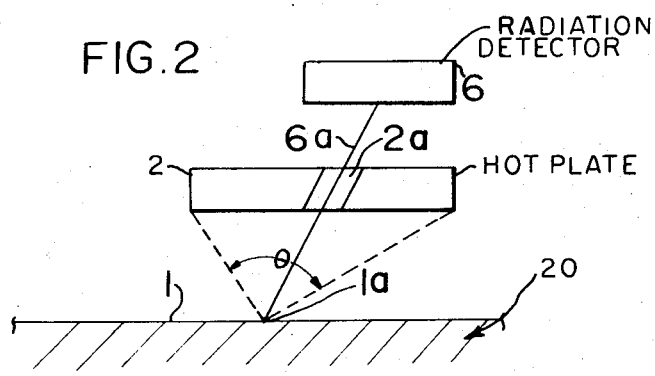
FIG. 2 is a schematic diagram of another embodiment of the method of the invention showing particularly a preferred position of a radiation source hot plate relative to an object to be measured.

FIG. 2 is another embodiment of the present invention showing a preferred position of the radiation source hot plate 2 relative to the surface 1 of the object 20 to be measured. As shown in FIG. 2, if the measurement is effected by the radiation detector 6 through an aperture 2a formed in radiation source hot plate 2, the object surface 1 and the radiation source hot plate 2 can be arranged substantially parallel to each other, thereby simplifying the physical arrangement of the whole system.

It will thus be seen that the present invention comprises an improved method for measuring the surface temperature of metals by a radiation thermometer, in which a radiation source hot plate 2 having a surface whose surface temperature is kept substantially constant and whose surface emissivity is close to unity, is located opposite to that area 1a of an object 20 to be measured. The surface temperature of the hot plate 2 is maintained higher than that of the measurement area 1a of the object, and the temperature of the area 1a is considerably lower than the temperature of area 8b. The radiation source hot plate 2 is arranged so that the solid angle $\theta$ as viewed from the point 1a of reflection on the object to be measured lies within the range $\pi < \theta < 2\pi$, whereby the reflected output $V_1$ of the radiant energy from the radiation source hot plate is measured first and the radiant power $V_1$ of the radiation source hot plate is then measured, and the emissivity of the object is then obtained from the equations (1) to (3) and supplied to a correction circuit to thereby automatically correct the output of a radiation thermometer. Thus, the improved method of the present invention, by virtue of the correction of emissivity, can always be applied most advantageously to the measurement of the surface temperature of metal products such as color coated sheet iron on a continuous line where the characteristics of the objects to be measured and hence the emissivity vary considerably.

We claim:

1. A method for measuring the surface temperature of a metal object utilizing a radiation thermometer and a radiation source hot plate, said hot plate having a surface emissivity close to unity and being located opposite to the surface of the metal object which is to be measured and radiating heat at an area of the metal surface which is at a temperature considerably lower than the area of said surface whose temperature is to be measured, comprising:

maintaining the temperature of said hot plate substantially constant and considerably higher than the area of said metal surface which is irradiated by said hot plate;

arranging said hot plate such that a solid angle $\theta$ observed from a point of radiation on said metal surface lies within a range $\pi < \theta < 2\pi$;

measuring the radiant heat reflected by said metal surface from the area of irradiation by said hot plate;

correlating the radiant output of said hot plate with said reflected radiant heat to determine the emissivity of said metal surface;

measuring the temperature of said metal surface at a point which is substantially higher in temperature than the area of said metal surface which is irradiated by said hot plate; and correcting said temperature measurement with the determined value of emissivity to thereby obtain the surface temperature of said metal surface.

2. The method according to claim 1 wherein said step of correlating the radiant output of said hot plate with said reflected radiant heat comprises:

determining the reflectance ($\gamma$) of said metal surface at the area irradiated by said hot plate; and then determining the emissivity ($\epsilon$) in accordance with the equation $\epsilon = 1.0 - \gamma$.

3. A method according to claim 2 wherein the reflectance of said metal surface is determined in accordance with the equation $\gamma = V/V_1$, where $V$ is the radiant heat reflected from said surface, and $V_1$ is the radiant heat emitted by said hot plate.

4. A method according to claim 1 wherein said step of correcting said temperature measurement comprises correcting said temperature measurement, the correction being a function of the determined value of emissivity.

5. A method according to claim 4 wherein said temperature correction is a function of the determined value of emissivity.

6. Apparatus for measuring the surface temperature of a metal object comprising:

a radiation thermometer for measuring the temperature of the metal object at a high temperature point of said metal object;

a radiation source hot plate having a surface emissivity close to unity located opposite to the surface of the metal object which is to be measured and radiating heat at an area of the surface of the metal object which is at a temperature considerably lower than the area of the surface of the metal object whose temperature is being measured by the radiation thermometer;

means for maintaining the temperature of said hot plate substantially constant and considerably hotter than the area of the metal surface which is irradiated by said hot plate;

means for measuring the radiant heat reflected by said metal surface from the area of irradiation by said hot plate;

means for correlating the radiant output of said hot plate with said reflected radiant heat and for determining the emissivity of said metal surface as a function of siad radiant output and said reflected radiant heat; and means responsive to said determined emissivity of said metal surface and to the output of said radiation thermometer for generating a corrected value of temperature which corresponds to the surface temperature of said metal object at said high temperature point.

7. Apparatus according to claim 6 wherein said hot plate is arranged relative to said metal surface such that a solid angle $\theta$ observed from a point of radiation on said metal surface lies within a range $\pi < \theta < 2\pi$.

8. Apparatus according to claim 6 wherein said correlating means includes means for determining the reflectance $\gamma$ of said metal surface at the area irradiated by said hot plate, and means for determining the emissivity ($\epsilon$) in accordance with the equation $\epsilon = 1.0 - \gamma$.

9. Apparatus according to claim 8 wherein said means for determining the reflectance of said metal surface includes means for determining the ratio $V/V_1$, where $V$ is the radiant heat reflected from said surface and $V_1$ is the radiant heat emitted by said hot plate, the reflectance being given by the equation $\gamma = V/V_1$.

10. Apparatus according to claim 6 wherein said means for generating a corrected value of temperature includes means for varying the temperature measurement from said radiation thermometer in proportion to the value of emissivity determined by said correlating means.

11. Apparatus according to claim 10 wherein said temperature correction is a linear function of the determined value of emissivity.

12. Apparatus according to claim 6 wherein said hot plate is inclined relative to the surface of said metal object.

13. Apparatus according to claim 6 wherein said hot plate is substantially parallel to said metal surface.

14. Apparatus according to claim 13 wherein said hot plate includes an opening therein through which said radiant heat reflected by said metal surface is measured by said reflected radiant heat measuring means.

* * * * *

UNITED STATES PATENT OFFICE
CERTIFICATE OF CORRECTION

Patent No. 3,796,099         Dated March 12, 1974

Inventor(s) Teruo SHIMOTSUMA, et al

It is certified that error appears in the above-identified patent and that said Letters Patent are hereby corrected as shown below:

Claim 5, line 2, before "function" insert --linear--.

Signed and sealed this 17th day of September 1974.

(SEAL)
Attest:

McCOY M. GIBSON JR.
Attesting Officer

C. MARSHALL DANN
Commissioner of Patents